O. GINGRAS.
SHOCK ABSORBER.
APPLICATION FILED JUNE 16, 1915.
1,189,682.　　　　　　　　　　Patented July 4, 1916.
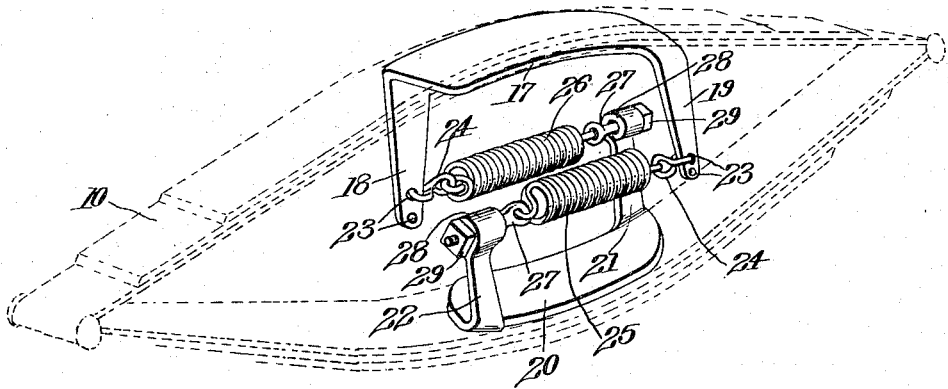
Witnesses
G. J. Baker
B. M. Kent
Inventor
Octave Gingras
by Foster Freeman Watson & Cook
Attorneys

UNITED STATES PATENT OFFICE.

OCTAVE GINGRAS, OF LAUREVILLE, QUEBEC, CANADA.

SHOCK-ABSORBER.

1,189,682.     Specification of Letters Patent.     Patented July 4, 1916.

Application filed June 16, 1915. Serial No. 34,539.

*To all whom it may concern:*

Be it known that I, OCTAVE GINGRAS, a subject of the King of England, residing at Laureville, Magantic county, Province of Quebec, Dominion of Canada, have invented certain new and useful Improvements in Shock-Absorbers, of which the following is a specification.

This invention relates to shock absorbers for vehicles and particularly for motor or horse drawn vehicles and has for its objects the provision of a simple and comparatively inexpensive construction which will not interfere with the normal yielding movement of the vehicle spring and at the same time will come into action to reinforce the vehicle springs when they are subjected to abnormal deflections.

Other objects and the features of novelty will be apparent from the following description, taken in connection with the following drawings, in which, Figure 1 is a perspective view of a vehicle spring having my invention applied thereto; Fig. 2 is a transverse section of Fig. 1, on an enlarged scale, certain parts for securing the spring, which are not shown in Fig. 1, being also shown.

Referring to the drawings, 10 indicates a vehicle spring, which is shown in the drawings as of the full elliptic form, but which, it will be understood, may be semi-elliptic or three-quarters elliptic. A bracket 11 or seat for the spring is indicated in dotted lines in Fig. 2, this seat being attached to the vehicle body in any preferred manner. The upper part of the spring 10 is secured to the seat 11 by means of a clamping plate 12 and bolts 13 which are indicated in Fig. 2. The lower part of the spring 10 is shown as secured on a seat 14 which may be a part of the vehicle axle. The spring is clamped to the seat 14 by means of a plate 15 and bolts 16. A member 17 provided with the arms or brackets 18 and 19 is secured on the under side of the upper part of the spring 10 by means of the clamping plate 12 or in any other suitable manner. A member 20 substantially of the same form as the member 17 is secured on the lower part of the spring 10 by means of the plate 15. The member 20 is provided with the arms or brackets 21 and 22. From Fig. 2 it will be apparent that the brackets 18, 19, 21 and 22 are arranged outside of the spring 10 so as not to interfere with the movements of the spring. The brackets 18 and 19 are provided with one or more openings 23 in their ends in which links 24 are secured. A pair of springs 25 and 26, arranged on opposite sides of the spring 10, are connected with the links 24 and with bolts 27 which pass through the eyes 28 at the ends of the brackets 21 and 22. The springs 25 and 26 are of the ordinary coil or helical form and the initial tension of these springs may be varied by means of the nuts 29 on the bolts 27.

The springs 25 and 26 are shown in their normal position in the drawings and it will be apparent that slight relative movements of the brackets to which the ends of the springs are attached will produce a rocking movement of the springs without any substantial change in the length or tension thereof. Any abnormal deflection of the spring 10, however, will produce an extension of the springs 25 and 26 and these springs will therefore reinforce the spring 10. The springs 25 and 26 being arranged outside of the spring 10 will not interfere with the movements of the latter and the normal arrangement of the springs 25 and 26 being substantially at right angles to the direction of relative movement of the brackets, the springs 25 and 26 will be adapted to reinforce the spring 10 either for an abnormal compression or abnormal extension or opening of the latter. In other words, the springs 25 and 26 serve as shock absorbers and are adapted to act in either direction.

It will be understood that the drawings are merely illustrative of the principles of my invention and it is not intended that they shall accurately show the exact details of construction and therefore I do not wish to be limited to the details shown, claiming all modifications which come within the scope of the claims.

Having thus described the invention, what is claimed and desired to be secured by Letters Patent is:

1. The combination with two members and a spring arranged in a vertical plane forming a yieldable connection therebetween and preventing substantial relative lateral movement thereof, of brackets connected with each of said members, and a coil spring having its ends connected with said brackets and movable therewith, said coil spring being normally arranged with its axis parallel to the plane of said first mentioned spring and at right angles to the direction of relative movement of said brackets.

2. The combination with two members and a spring arranged in a vertical plane forming a yieldable connection therebetween and preventing substantial relative lateral movement thereof, of brackets connected with each of said members and arranged at one side of said spring, and a coil spring having its ends connected with said brackets and movable therewith, said coil spring being normally arranged with its axis parallel to the plane of said first mentioned spring and at right angles to the direction of relative movement of said brackets.

3. The combination with two members and a spring forming a yieldable connection therebetween, of a pair of brackets connected with each of said members and arranged on opposite sides of said spring, and a pair of coil springs each of which has its ends connected with the brackets on the same side of said spring and normally arranged substantially at right angles to the direction of relative movement of the brackets.

In testimony whereof I affix my signature.

OCTAVE GINGRAS.

Copies of this patent may be obtained for five cents each, by addressing the "Commissioner of Patents, Washington, D. C."